US007017412B2

(12) United States Patent
Thomas et al.

(10) Patent No.: US 7,017,412 B2
(45) Date of Patent: Mar. 28, 2006

(54) CONTINUOUS WAVE ULTRASONIC PROCESS MONITOR FOR POLYMER PROCESSING

(75) Inventors: Charles L. Thomas, Salt Lake City, UT (US); Russell Edwards, Aloha, OR (US); Liyong Diao, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 10/417,800

(22) Filed: Apr. 16, 2003

(65) Prior Publication Data

US 2004/0025592 A1    Feb. 12, 2004

Related U.S. Application Data

(60) Provisional application No. 60/373,963, filed on Apr. 18, 2002.

(51) Int. Cl.
*G01B 17/00* (2006.01)

(52) U.S. Cl. ............. 73/579; 73/290 V; 264/407; 425/145; 425/169

(58) Field of Classification Search ............... 73/64.42, 73/64.53, 579, 290 V; 264/407; 425/135, 425/145, 169; 374/117
See application file for complete search history.

(56) References Cited

U.S. PATENT DOCUMENTS

| 3,824,842 | A | | 7/1974 | Wirt et al. |
|---|---|---|---|---|
| 3,883,841 | A | | 5/1975 | Norel et al. |
| 4,249,422 | A | | 2/1981 | Gaunaurd et al. |
| 4,403,508 | A | | 9/1983 | Langlois |
| 4,758,803 | A | * | 7/1988 | Thomas, III ............... 264/407 |
| 4,768,379 | A | | 9/1988 | Arcas et al. |
| 5,085,080 | A | | 2/1992 | Yu |
| 5,433,112 | A | | 7/1995 | Piche et al. |
| 5,528,933 | A | | 6/1996 | Nemirow |
| 5,708,209 | A | | 1/1998 | Stiffler et al. |

(Continued)

FOREIGN PATENT DOCUMENTS

EP    0088362 A1    9/1983

(Continued)

*Primary Examiner*—John E. Chapman
(74) *Attorney, Agent, or Firm*—Thorpe North & Western LLP

(57) ABSTRACT

An injection molding apparatus is disclosed that includes an injection mold, a mold injector, and means for monitoring the injection mold process using acoustic energy. The injection mold includes a cavity for receiving an injection mold material, such as a polymer as injected via the mold injector. The monitoring system includes an acoustic energy generator, an ultrasonic crystal, and an energy monitoring device. The acoustic energy generator produces continuous acoustic energy to be non-invasively applied to the injection mold as the polymer is delivered into the mold. The energy monitoring device monitors changes in dynamic parameters of a resulting continuous resonant frequency established by the acoustic energy generator through the ultrasonic crystal. The ultrasonic crystal serves also as a transducer to receive an output signal from the mold to be delivered to the energy monitoring device. It is this output signal that is processed to determine dynamic parameters that change based on the change of the continuous resonant frequency. This change of dynamic parameters can identify at least one characteristic of the polymer such that refined control of the injection process may be achieved by monitoring such characteristics through the continuous wave resonant frequency monitoring approach applied by the monitoring system.

33 Claims, 8 Drawing Sheets

U.S. PATENT DOCUMENTS

| | | |
|---|---|---|
| 5,789,675 A | 8/1998 | Blaine et al. |
| 5,824,908 A | 10/1998 | Schindel et al. |
| 5,886,262 A * | 3/1999 | Sinha .................. 73/579 |
| 5,951,163 A * | 9/1999 | Jen et al. .................. 374/119 |
| 6,023,970 A | 2/2000 | Blaine |
| 6,083,168 A | 7/2000 | Hossack et al. |
| 6,085,594 A | 7/2000 | Gutierrez et al. |
| 6,192,752 B1 | 2/2001 | Blaine |
| 6,284,113 B1 | 9/2001 | Bjornson et al. |
| 6,296,385 B1 | 10/2001 | Balasubramaniam et al. |
| 6,513,385 B1 | 2/2003 | Han et al. |
| 6,925,868 B1 * | 8/2005 | Young et al. ............. 73/290 V |

FOREIGN PATENT DOCUMENTS

| | | |
|---|---|---|
| EP | 0595104 A1 | 5/1994 |

* cited by examiner

CONTINUOUS WAVE ULTRASONIC PROCESS MONITOR FOR POLYMER PROCESSING

This application claims the benefit U.S. Provisional Application No. 60/373,963, filed Apr. 18, 2002, and entitled "Continuous Wave Ultrasonic Process Monitor for Polymer Processing."

BACKGROUND OF THE INVENTION

1. Field of the Invention

The present invention relates generally to monitoring systems for use in process manufacturing apparatus and, more specifically, the present invention relates to cavity based ultrasonic resonance monitoring in plastic molding processes and an apparatus for performing the same.

2. Background of the Art

Modern injection molding practice requires the measurement of "plastic" variables such as melt temperature and cavity pressure in order to produce the highest quality polymer parts. While the plastic variables have been shown to be important, sensing these variables has been difficult due to the invasive nature of existing sensing techniques. Three common problems in using ultrasonic sensing techniques have been the high cost of the required equipment, the delicate nature of the equipment, and the level of understanding required to operate the equipment.

The pressure exerted on the mold walls by the melted polymer, or cavity pressure, is currently used in commercial molding systems for control of switch-over between injection phase and packing phase and for Statistical Process Control ("SPC"). These systems utilize a transducer installed in the mold cavity, near a gate, so that the initial pressure rise as the polymer flows past the sensor face is used to detect the position of the polymer melt front in the mold cavity. When the pressure reaches a threshold level, the injection RAM is slowed from high speed injection to low speed packing. In SPC applications, transducers are installed at various locations in the cavity and the shape of the cavity pressure curve is monitored to indicate variation in the molding process. Both of these techniques achieve lower part-to-part variation and higher quality.

The process of injecting a polymer within a mold is typically performed in two stages. The first stage is to rapidly inject the polymer using an injection RAM operating at a first or high speed. The second stage is to slow the injection RAM to a second or low speed to perform packing. The two stages are necessary to rapidly perform the molding sequence while avoiding overpacking or flashing as the mold becomes full.

Various sensing techniques have been developed to measure the temperature of the melted polymer during processing and knowledge of this melt temperature has been used to provide more precise control of the process. Direct measurement of melt temperature provides a distinct advantage since the relationship between the multiple machine variables that affect melt temperature and the actual temperature is quite complex.

The drawback to each of these techniques is primarily the invasive nature of the measurement. Direct cavity pressure measurement requires a hole cut into the mold cavity, which results in a noticeable mark on the molded product. In situations where this is unacceptable, such as automotive lighting lenses, optical disks, et cetera, the sensor cannot be used. The common melt temperature sensing techniques often require a probe extended into the melt and have difficulty in defining the sensed volume reliably. Non-invasive measuring techniques have been developed to correct for these problems. These solutions typically include the use of ultrasonic sensors in both extrusion and injection molding, and as a post manufacture crystallinity sensor. Ultrasound velocity is sensitive to both temperature and pressure in an injection mold cavity. Another solution has utilized ultrasound to monitor the polymer state during extrusion.

While the ultrasound techniques show promise, the equipment typically required in such systems is very expensive, very delicate, and quite complex to operate.

Accordingly, what is needed is a non-invasive monitoring system for use in the molding arts, such as injection or extrusion, that is less expensive than the prior art, less complex, and easier to use than that of the prior art.

SUMMARY OF THE INVENTION

In accordance with the present invention, a process for continuously monitoring changing dynamic states of a target object is disclosed. The process first applies a continuous acoustic energy to the target object in a non-invasive manner. Next, the process generates at least one continuous resonant frequency within the target object. Then, the process monitors any parameter changes in the continuous frequency. Finally, the process determines the characteristics of the target object during the dynamic changes based on the changes in the parameters noted.

In addition, an injection molding apparatus is disclosed that includes an injection mold, a mold injector, and means for monitoring the injection mold process using acoustic energy. The injection mold includes a cavity for receiving an injection mold material, such as a polymer as injected via the mold injector. The monitoring system includes an acoustic energy generator, an ultrasonic crystal, and an energy monitoring device. The acoustic energy generator continuously produces acoustic energy to be non-invasively applied to the injection mold and polymer as it is delivered into the mold. The ultrasonic crystal serves as the device for transferring the acoustic energy from the acoustic energy generator to the injection mold. Typically the ultrasonic crystal is a piezoelectric crystal. The energy monitoring device monitors the changes in dynamic parameters of the continuous resonant frequency established by the acoustic energy generator through the ultrasonic crystal. The ultrasonic crystal serves also as a transducer to receive an output signal to be delivered to the energy monitoring device. It is this output signal that is processed to determine dynamic parameters that change based on the change of the continuous resonant frequency. This change of dynamic parameters can identify at least one characteristic of the polymer such that refined control of the injection process may be achieved by monitoring such characteristics through the continuous wave resonant frequency monitoring approach applied by the monitoring system.

Additional features and advantages of the invention will be apparent from the detailed description which follows, taken in conjunction with the accompanying drawings, which together illustrate, by way of example, features of the invention.

DETAILED DESCRIPTION OF SPECIFIC EMBODIMENT

The present invention introduces continuous wave ultrasound monitoring techniques that typically utilize a piezoelectric crystal to generate and detect ultrasonic energy applied to a test item. When the piezoelectric crystal is excited by an imposed electric voltage, the crystal changes shape, which produces a vibration. The vibration propagates through the thickness of the object to which it is attached, generating reflections at selected interfaces, such as between the crystal, the object, and any other layer touching approximate on another. The magnitude of the reflections is a function of the mismatch in material properties between the two interfacing materials. The reflected energy propagates back to the crystal, causing the crystal to vibrate, which then produces an alternating voltage. As suggested by the name continuous wave ultrasound, the crystal utilized in such a system vibrates continuously using a sine wave or other periodic waveform. This is in contrast to a conventional pulsed or intermittent wave that fails to realize continuous vibration of the crystal. The continuous vibration propagates into the material, reflecting from interfaces and the returning vibrations interact with the continuously vibrating crystal. The reflected vibrations affect the impedance of the crystal, and, by sensing changes in this impedance, information can be gained about the structure to which the crystal is coupled. Alternately, separate crystals can be used to generate and detect the ultrasonic energy applied to a test item, and by sensing the characteristics of the returning vibrations, information about the structure to which the crystal is coupled can be gained.

A prior art system related to the continuous wave ultrasound system of the present invention is known as pulsed ultrasound. Pulsed ultrasound is a technique whereby a pulse is sent out and then the crystal is monitored to detect any reflected pulses. Based on the amplitude and position of the reflected pulses, information about the system of plates can be inferred.

Pulsed ultrasound monitoring techniques and equipment are much more complex in terms of hardware since the crystal must be excited with a very short voltage spike and then the reflected echoes must be detected and displayed in reference to this initial pulse. Because of the high cost of implementing the pulsed ultrasound monitoring systems, they have been slow to be adapted within the injection molding industry.

Continuous waves, on the other hand, are much less complex to generate in hardware and to observe as compared to pulsed ultrasound waves. However, the reflected information is a superposition of every reflection.

Figure 1:
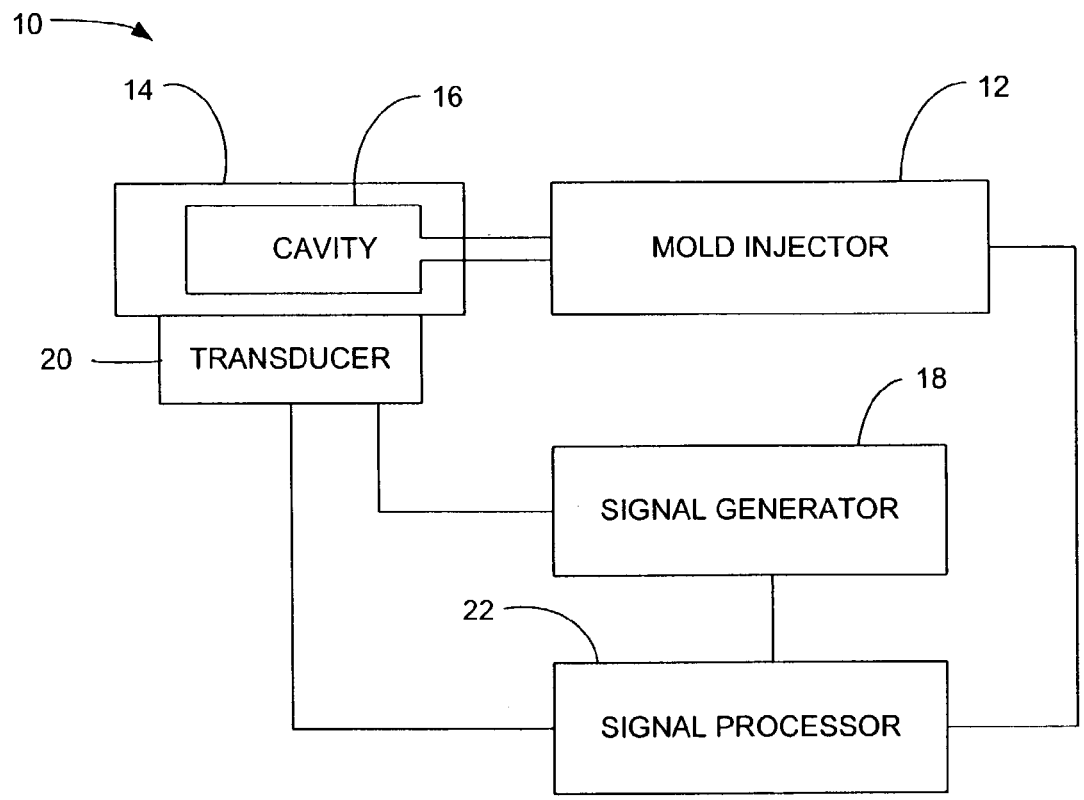
FIG. 1 is a schematic diagram of a molding apparatus utilizing a non-invasive, continuous wave ultrasound monitoring device in accordance with an embodiment of the present invention.

FIG. 1 illustrates a schematic diagram of an injection molding system 10 that incorporates a cavity based ultrasonic resonance monitoring system for use with the injection molding apparatus 10. Apparatus 10 includes a mold injector 12, which couples to a mold 14, which has a cavity 16 for receiving an injection mold material, such as a plastic polymer, for serving as the material to be molded. During the mold operation, a signal generator 18 generates a sine wave to drive a transducer 20, which is attached to mold 14. Transducer 20 vibrates such that a resonant frequency is established within the system, which includes the mold 14 and transducer 20. This resonant frequency is adjusted by controlling the signal generator 18 until such a desired resonant frequency is achieved. At this point, a signal processor 22, which is coupled to the signal generator 18, transducer 20, and mold injector 12, is used to monitor the return signal measured by transducer 20.

Once the system has established the appropriate resonant frequency for the combination of injection mold 14 and transducer 20, mold injector 12 performs the injection of the polymer within cavity 16. As the mold material or polymer is injected or flows into cavity 16, the resonant frequency or amplitude, or both, change. Transducer 20 is excited by signal generator 18, which generates a continuous sine wave or other periodic wave that is tuned to a frequency that matches the natural frequency of the transducer. As the transducer oscillates, the item to which it is attached, mold 14, begins to oscillate. The transducer is driven such that a natural frequency of the mold 14 is achieved.

As a vibration propagates through mold 14, it reflects from any interface. Thus, the reflected wave also reflects from the top surface of the cavity as well as the sides and the bottom of the cavity 16. A resonant frequency occurs whenever these multiple reflections are in phase and superimpose constructively.

In one specific embodiment, an ultrasonic crystal, which serves as transducer, 20 was installed in a flat bottom hole cut within a plate adjacent to the cavity portion 16 of mold 14. This allowed the ultrasonic wave from the ultrasonic crystal to be transmitted normal to the cavity surface striking centered on the mold cavity near an endgate of an endgated tensile specimen mold. The thickness of the material remaining between transducer 20 and the mold cavity 16 must be matched somewhat to the crystal frequency, but this can be relaxed when several options for crystal frequencies are used.

Figure 3A:
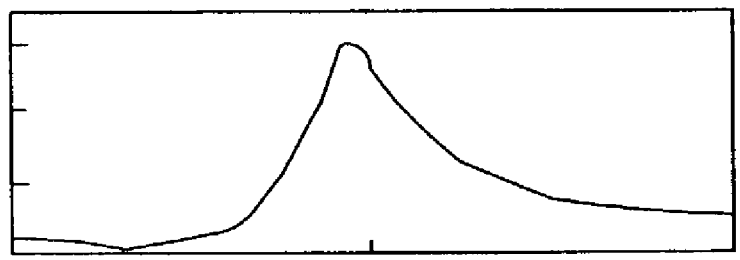
FIGS. 3a–3c illustrate Fourier Transform graphs of measurements obtained in accordance with the process of the present invention.
Figure 3B:
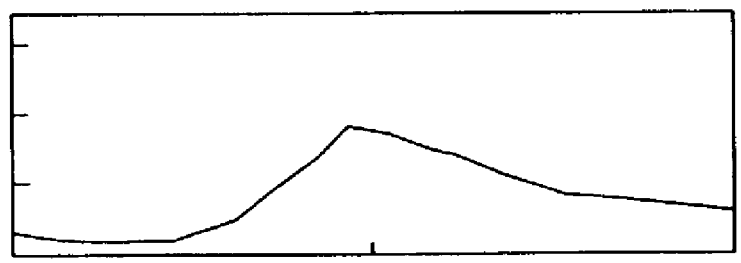
Figure 3C:
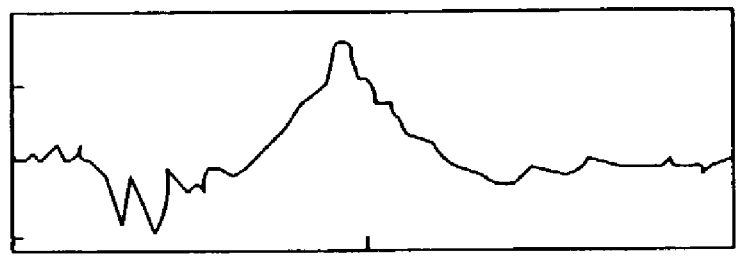

The driving frequency generated by signal generator 18 is selected based on the fundamental resonant frequency of the overall system being observed. Specifically, the frequency used should have the largest amplitude vibrations and the largest sensitivity. Selecting the resonant frequency was achieved by generating a sweeping sine wave, which varies in frequency between an adjustable $f_{min}$ and $f_{max}$. The intensity of the oscillation of the mold 14, to which transducer 20 is attached, was monitored through its effect on the crystal vibration. This signal was filtered to remove the driving sine frequency, which results in essentially an analog Fourier Transform (FT). Examples of the Fourier Transform are illustrated in FIGS. 3a–3c, which show a sine wave driving frequency sweeping in a narrow range around the resonant frequency, measured in amplitude and frequency, of the mold cavity plate. FIG. 3a represents an analog Fourier transform signal for a clamped empty mold. FIG. 3b represents an analog Fourier transform signal for a filled mold. FIG. 3c represents a ratio of the Fourier transform signals of FIGS. 3a and 3b. The peak amplitude in FIG. 3a represents the resonant frequency in the plate. This peak amplitude is partially damped in FIG. 3b. The ratio signal shows that the maximum amplitude signal is the most sensitive to changes in the mold, which is to be expected.

Since the amplitude of vibration is affected by dampening the plate surface by contacting polymer, changes in the conditions inside the mold should change the amplitude of the Fourier transform signal. Using the Fourier transform signal, it is possible to identify frequencies at which the signal is most sensitive to changing conditions in the mold. Accordingly, using the identified frequencies, signal processor 22 is programmed to output first and second analog signals, the first signal being proportional to amplitude and the second signal being proportional to frequency. These output signals are then utilized as feedback to control the molding process, such as how much and for how long material is injected, when the packing phase begins, and when to stop injection or packing.

As the polymer is injected within cavity 16 during the application of the ultrasound energy to the mold, the loading polymer causes the amplitude of the resonant frequency to change, which represents changing dynamic states within mold 14 as the polymer continues to fill cavity 16. Based on these changing dynamic states, typically observed as either frequency changes or amplitude changes, information relating to the transition from injection phase to packing phase may be observed as well as performing a short shot detector, which detects when insufficient molding material has been injected into the mold, as well as providing feedback for the SPC, and providing a melt temperature monitoring.

Figure 4A:
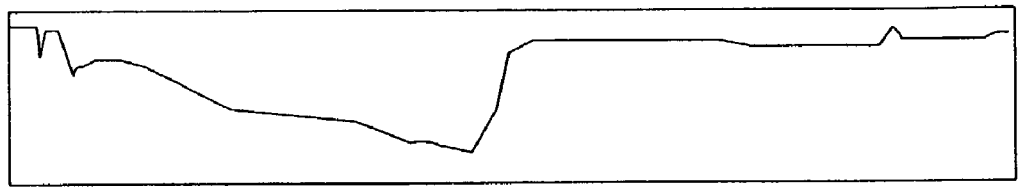
FIGS. 4a–4c illustrate selected signals measured during a molding procedure as measured using the method according to the present invention.
Figure 4B:
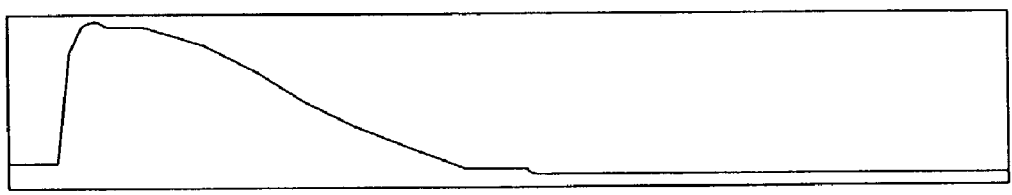
Figure 4C:
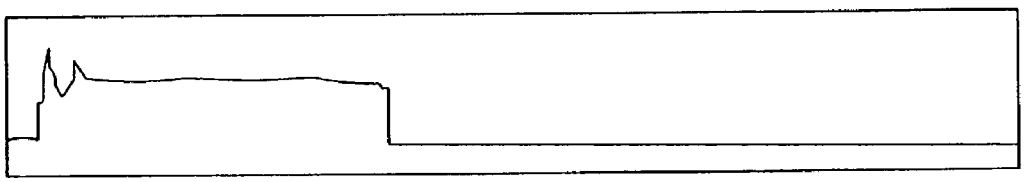

FIGS. 4a–4c illustrate various signals measured during a molding procedure. FIG. 4a depicts a single frequency magnitude signal extracted. FIG. 4b illustrates the cavity pressure from a cavity pressure transducer installed in the mold at the same point the ultrasonic signal is measured and recorded at the same time as that as the signal of FIG. 4a. FIG. 4c illustrates the hydraulic pressure also recorded at the same time as the signals of both FIGS. 4a and 4b. There is a close temporal correspondence between an initial drop in the ultrasound intensity and the initial rise in the cavity pressure signal typically monitored. Each of these signals remains down or up respectively even after the hydraulic pressure has been removed. Both the cavity pressure signal and the ultrasound signals are plastic based signals responding to changes in the polymer state in the mold 14 during processing.

Figure 2:
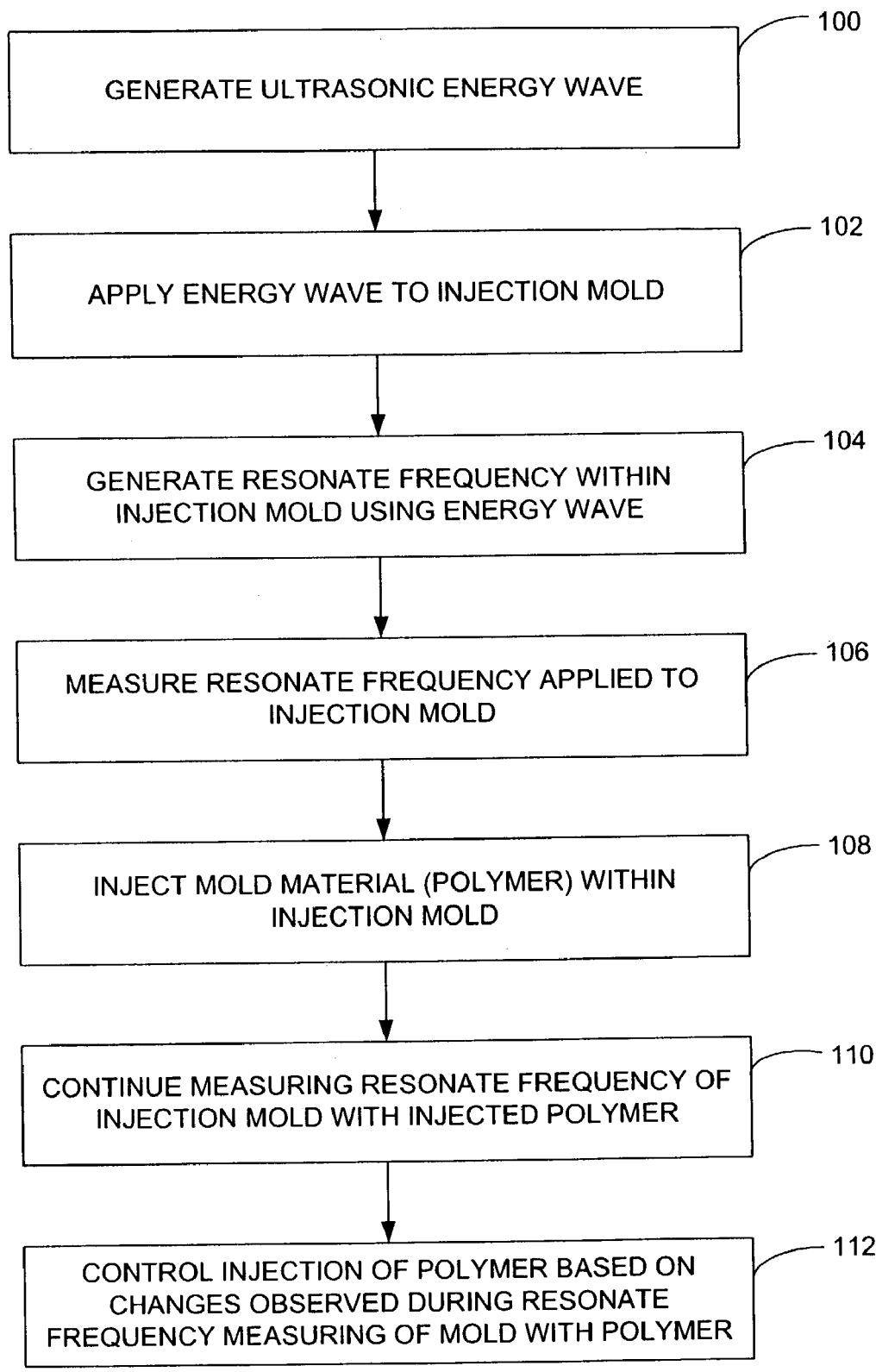
FIG. 2 is a flow diagram of the method of operation of the ultrasound monitoring device illustrated in FIG. 1 and in accordance with the present invention.

FIG. 2 illustrates a flow diagram of the process steps performed by apparatus 10, specifically the ultrasound monitoring system utilized in apparatus 10. Beginning at block 100, the signal generator 18 generates an ultrasonic energy wave for application to transducer 20. Next, as shown in block 102, the energy is applied to the injection mold through transducer 22. The energy wave is applied in a sweeping sine wave until a resonant frequency is detected and generated within the injection mold using the energy wave, which is shown in block 104. The system then performs a measurement of the resonant frequency as applied to the injection mold, shown in block 106. Once the measurements are being performed and the energy being applied, the injection molder 12 injects mold materials, such as a polymer, within injection mold 14, as shown in block 108. Next, in block 110, the system continues to measure the resonant frequency of the injection mold as the polymer is injected therein. The material injection causes a change in the frequency or in amplitude, or both, which represents a dynamic change of state of the mold with the injected polymer. Based on the measurement being performed, the system then is able, as shown in block 112, to control the injection of polymer based on the changes observed during the resonant frequency measuring of the mold as the polymer is delivered therein. Signal processor 22 receives the output signal from transducer 20 and utilizes it to provide signals to mold injector 12 to control the delivery of the polymer during the injection process.

Figure 5:
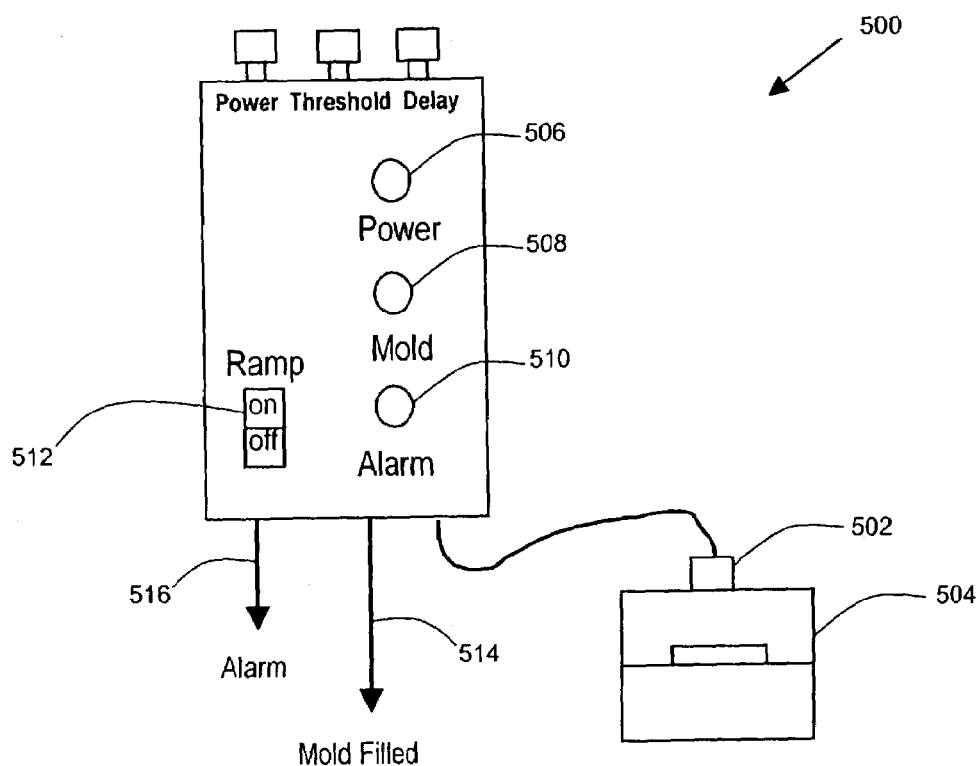
FIG. 5 is a schematic diagram of a molding system utilizing a melt position sensor in accordance with an embodiment of the present invention.
Figure 7:
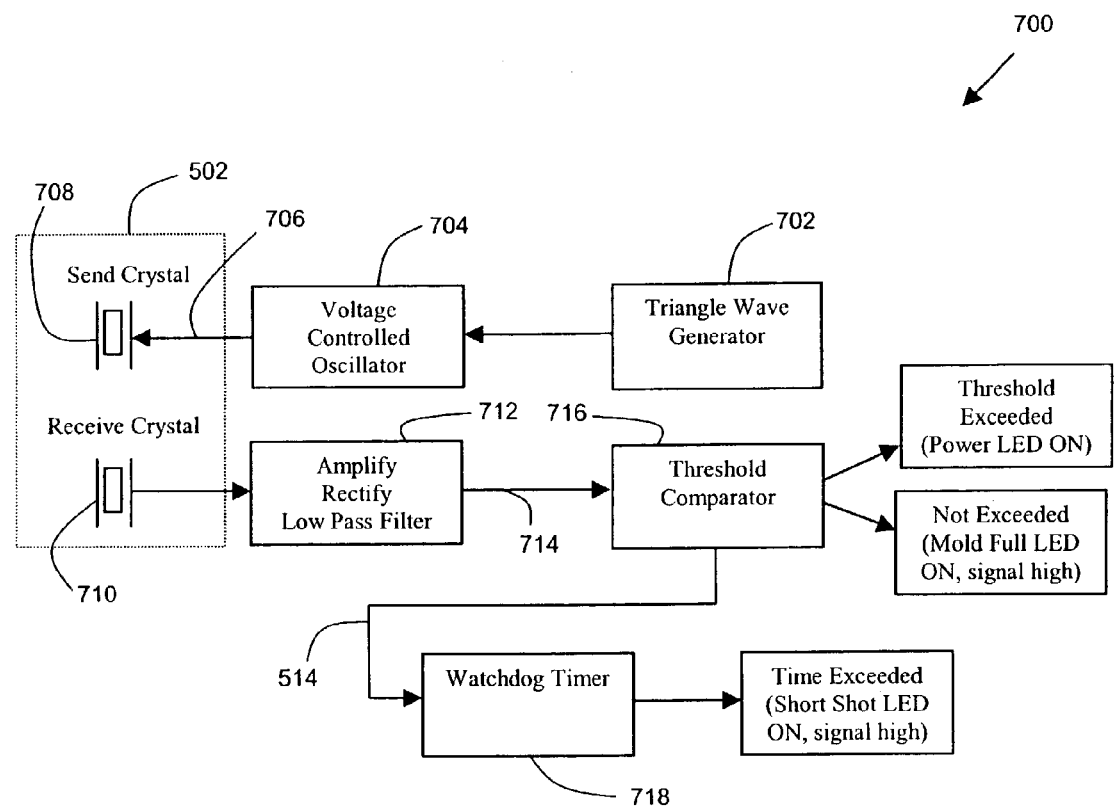
FIG. 7 is a schematic diagram of electronics of the melt position sensor illustrated in FIG. 5 and in accordance with an embodiment of the present invention.

FIG. 5 illustrates a molding system that incorporates a melt position sensor in accordance with an embodiment of the present invention. A melt position sensor 500 comprises transducer 502, which is attached to mold 504; indicators 506, 508, and 510; selector 512; and output signals for "mold filled" 514 and "alarm" 516. FIG. 7 illustrates a schematic diagram of the melt position sensor electronics 700, in accordance with the present invention, where the transducer 502 has been implemented by means of a separate send crystal 708 and receive crystal 710.

A triangle wave generator 702 causes a voltage controlled oscillator (VCO) 704 to output a sine wave 706 that sweeps repeatedly up and down in frequency from a minimum to a maximum frequency. The sine wave is applied to send crystal 708, which injects the ultrasonic signal into the mold 504. The maximum voltage, minimum voltage, and frequency of the triangle wave control the maximum frequency, minimum frequency, and the rate of sweep. Typically, the minimum and maximum frequencies are set in the megahertz range, enclosing one or more natural resonances of both the sending crystal and the mold wall. The frequency of the triangle wave is set in the low kilohertz range. By using a swept frequency sine wave as just described, a transducer of nominal frequency can be applied to mold walls of a variety of thicknesses without tuning or adjustment. For example, a 3.3 to 3.7 MHz transducer applied to a mold wall from ¾ inch to 1 and ¾ inch thick would work without adjustment.

Send crystal 708 generates a resonant vibration in the mold wall that is monitored by receive crystal 710. This signal is amplified, rectified, and sent through a low pass filter 712, producing a voltage level 714 proportional to the intensity of the vibrations in the mold wall. The voltage level 714 is then compared to a threshold in comparator 716. When the mold is empty, a relatively high voltage level 714 will be output. When plastic passes in front of the transducer, the plastic damps the vibrations, resulting in relatively low voltage level 714. The threshold of the comparator is set so that, when the mold is empty, the relatively high voltage level will exceed the threshold, and indicator 508 will light showing that the mold is empty. When the mold is full, the relatively low voltage level will be below the threshold, and indicator 506 will light showing that the mold is full.

Figure 6:
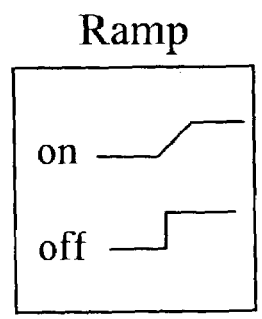
FIG. 6 illustrates output signals obtained from the melt position sensor illustrated in FIG. 5 and in accordance with an embodiment of the present invention.

The threshold of the comparator is set so that if the mold is empty the threshold is exceeded, and if plastic passes in front of the transducer, the plastic damps the vibrations, the voltage level drops and the threshold is exceeded. When the voltage level 714 drops from a relatively high level to a relatively low level, the threshold comparator 716 will also output a "mold-filled" signal 514 which may be used to control the mold injector 12. Based on the position of selector 512, the mold-filled signal 516 can take the form of a step or a ramp as shown in FIG. 6. The step indicates the instant plastic passes in front of the transducer; the ramp allows a user to create an adjustable time delay after the plastic passes in front of the transducer by setting an adjustable threshold on the mold injector 12 receiving the signal from the melt position sensor.

Watchdog timer 718 provides a short shot sensor by detecting any time the mold does not fill for an entire cycle. The watchdog timer 718 comprises a timer with an adjustable time constant. Any time the timer delay is exceeded, the alarm sounds. Each time the mold fills, the mold-filled signal 514 resets the timer. Hence, by setting the timer delay between one and two cycles, the timer will sound an alarm whenever a short shot occurs.

Figure 8:
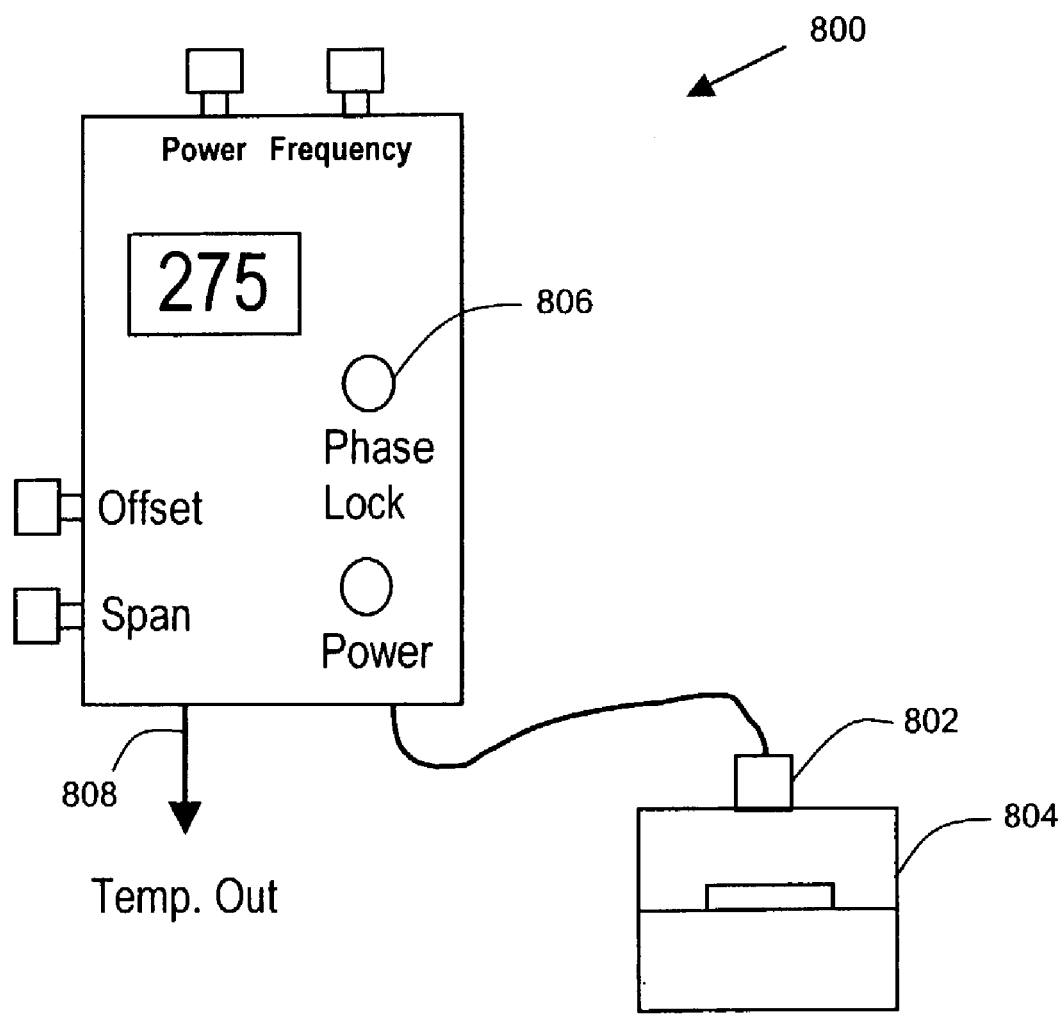
FIG. 8 is a schematic diagram of a molding system utilizing a melt temperature sensor in accordance with an embodiment of the present invention.
Figure 9:
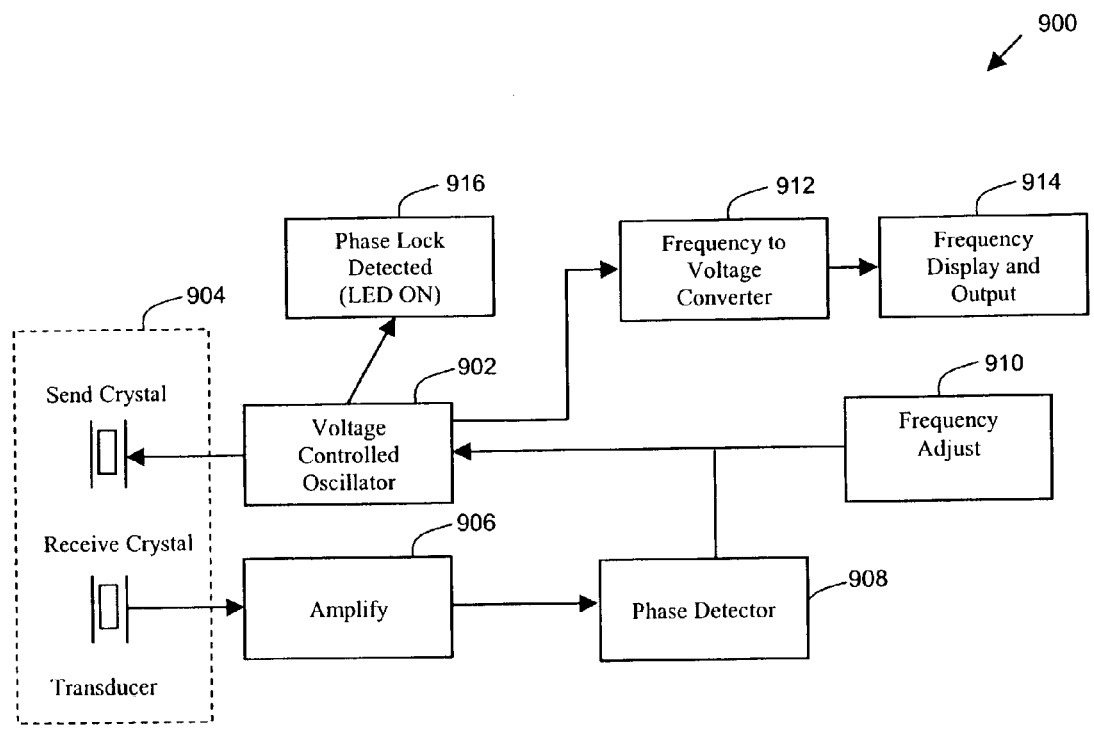
FIG. 9 is a schematic diagram of the electronics of the melt temperature sensor illustrated in FIG. 8 and in accordance with an embodiment of the present invention.

FIG. 8 illustrates a molding system that incorporates a melt temperature sensor in accordance with another embodiment of the present invention. A melt temperature sensor 800 comprises transducer 802, which is attached to mold 804, indicator 806, and output signal "temp out" 808. FIG. 9 illustrates a schematic diagram of the melt temperature sensor electronics 900, in accordance with the present invention.

VCO 902 is set to a nominal frequency near an expected resonance of the polymer layer. The output of VCO 902 is applied to the transducer 904, which injects the ultrasonic signal into the mold 804. The ultrasonic signal received back from the polymer is converted by transducer 904, amplified by amplifier 906 and applied to phase detector 908. When the VCO 902 frequency is adjusted close to the resonant frequency of the polymer layer, a signal is received from the polymer. The VCO 902 frequency is manually adjusted 910 until the phase lock LED 916 lights, indicating that a resonance has been established.

The phase detector 908 compares the phase of this signal to the phase of the output of the VCO 902 and generates a voltage proportional to the difference. This voltage is applied to the VCO 902, acting as feedback. Once the phase detector has received a signal, this feedback loop will automatically adjust the output of the VCO up or down to follow a resonance that changes due to changing temperature of the polymer within the mold. The frequency of the VCO is thus proportional to the temperature of the polymer. In order to output temperature information, the VCO 902 output is sent to a frequency to voltage converter 912 to produce a voltage which is then displayed and output 914. The offset and span of this voltage can be adjusted to calibrate the output in terms of temperature. Temperature calibration proceeds as follows: the polymer is set to a known, low temperature and the offset is adjusted until the display shows the desired temperature. Next, the temperature of the polymer is increased to a second, higher temperature and the span is adjusted until the display shows the new temperature. It may be necessary to iterate this calibration once or twice to reach optimum accuracy. At this point, the sensor will display the temperature of the melted polymer; as well as output "temp out" 808, a voltage proportional to this temperature which may be used to further control the molding process.

It is to be understood that the above-described arrangements are only illustrative of the application for the principles of the present invention. Numerous modifications and alternative arrangements can be devised without departing from the spirit and scope of the present invention. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variation in size, materials, shape, form, function and manner of operation, assembly and use may be made without departing from the principles and concepts set forth herein.

What is claimed is:

1. A process for continuously monitoring changing dynamic states of an injection mold having a cavity, comprising:
   a. noninvasively applying continuous acoustic energy to the cavity;
   b. generating at least one continuous resonant frequency within the cavity;
   c. causing changing dynamic states within the cavity, wherein the change in dynamic states is in consequence of injection mold material flowing into the cavity;
   d. monitoring changes in parameters of the at least one continuous resonant frequency resulting from the changing dynamic states;
   e. determining characteristics of the cavity based on changes of the monitored parameters; and
   f. controlling the rate of flow of injection mold material into the injection mold cavity based on the parameter changes monitored.

2. The process according to claim 1 wherein the parameters comprise acoustic energy frequency.

3. The process according to claim 1 wherein the parameters comprise acoustic energy amplitude.

4. The process according to claim 1 wherein the parameters comprise acoustic energy frequency and amplitude.

5. The process according to claim 1 wherein the continuous acoustic energy is ultrasonic.

6. A process according to claim 1, wherein the monitoring step, comprises the more specific step of monitoring changes in a parameter of the continuous resonant frequency within the cavity indicating a change from a first state to a second state of the cavity.

7. A process for monitoring an injection mold having a cavity that transitions from a first state to a second state, comprising continuously measuring resonant acoustic energy dynamic characteristics within the cavity to observe a transition from the first state to the second state based on changes in parameters of the resonant frequency, wherein the first state is the initiation of injecting an injection mold material and the second state is completion of injecting the injection mold material.

8. A process for monitoring changing states of a polymer within a mold, comprising:
   a. noninvasively generating a continuous resonant frequency within the mold prior to molding the polymer;
   b. monitoring a change in a parameter of the continuous resonant frequency within the mold with progressive molding of the polymer, indicating a change from a first state to a second state, wherein the first state is the initiation of injecting an injection mold material and the second state is completion of injecting the injection mold material.

9. The process according to claim 8 wherein step (a) comprises applying a continuous acoustic energy to the mold during processing the polymer.

10. The process according to claim 8 wherein the continuous resonant frequency is produced using ultrasonic acoustic energy.

11. The process according to claim 8 further comprising the step of:
   c. determining at least one characteristic of the polymer based on the change of the monitored parameter.

12. The process according to claim 11 wherein the at least one characteristic includes a flow state of the polymer within the mold.

13. The process according to claim 8 wherein the parameter comprises acoustic energy frequency.

14. The process according to claim 8 wherein the parameter comprise acoustic energy amplitude.

15. An apparatus for continuously monitoring changing dynamic states of an injection mold having a cavity, comprising:
    an acoustic energy generator configured for coupling to the injection mold to apply continuous wave acoustic energy to the cavity;
    a frequency selector coupled to the generator and configured for adjustment to a range of frequencies including a resonant frequency for the cavity; and
    an energy monitoring device configured to monitor changes in parameters of the continuous wave acoustic energy resonant frequency and to control injection mold material flowing into the injection mold cavity based on the parameter changes monitored, wherein at least one characteristic of the cavity is determined based on the parameter changes monitored.

16. The apparatus according to claim 15 wherein the parameters comprise acoustic energy frequency.

17. The apparatus according to claim 15 wherein the parameters comprise acoustic energy amplitude.

18. The apparatus according to claim 15 wherein the acoustic energy is ultrasonic.

19. An apparatus for continuously monitoring changing dynamic states of a mold and a polymer within a mold, comprising:
    an acoustic energy generator that produces acoustic energy and is configured so that the acoustic energy can be applied to the mold and can be non-invasively applied to the polymer within the mold, and is configured so that a continuous wave ultrasound energy produced can include a resonant frequency produced within the mold prior to introduction of the polymer into the mold; and
    an energy monitoring device configured to be coupled to the mold, to monitor changes in at least one parameter of the a monitored continuous wave ultrasonic energy returned from the mold and to control injection mold material flowing into the injection mold cavity based on the parameter changes monitored, wherein at least one characteristic of the polymer is determined based on the parameter changes monitored.

20. The apparatus according to claim 19 wherein the parameters comprise frequency.

21. The apparatus according to claim 19 wherein the parameters comprise amplitude.

22. The process according to claim 19 wherein the acoustic energy is ultrasonic.

23. An injection molding apparatus comprising:
    an injection mold, having a cavity for receiving a polymer;
    a mold injector, coupled to the injection mold, to inject the polymer into the cavity to form a molded item made from the polymer;
    an acoustic energy generator that continuously produces acoustic energy to be non-invasively applied to the mold such that a continuous resonant frequency is produced within the injection mold;
    an ultrasonic emitter, coupled to the injection mold and the acoustic energy generator, to apply the acoustic energy from the acoustic energy generator to the injection mold; and
    an energy monitoring device responsive to the acoustic energy to monitor dynamic parameter changes of the continuous resonant frequency and to control injection mold material flowing into the injection mold based on the parameter changes monitored, wherein at least one characteristic of the polymer and at least one characteristic of the mold is determined based on the dynamic parameter changes monitored.

24. The injection molding apparatus according to claim 23 wherein the ultrasonic emitter and energy monitoring device are implemented by a single ultrasonic crystal.

25. The injection molding apparatus according to claim 23 wherein the ultrasonic emitter and energy monitoring device are implemented by separate ultrasonic crystals.

26. A molding process monitoring system, comprising:
    a sonic energy generator configured to impart a continuous wave sonic energy signal to a mold defining a cavity, said generator being configured to generate continuous wave sonic energy in a frequency range including a resonant frequency of the mold when the mold is empty;
    a sonic energy detector, configured to detect sonic energy returned by the mold and to detect change in at least one parameter of sonic energy returned by the mold;
    a processor configured to generate a signal indicative of an event in the molding process based upon changes in said at least one sensed parameter of the sonic energy returned by the mold;
    the system being configured so that a molding process can be monitored and injection mold material flowing into the cavity can be controlled based on said sonic energy imparted to and returned by the mold.

27. The system of claim 26, wherein the generator and detector both use the same electro-acoustical transducer.

28. The system of claim 27, wherein said transducer includes a piezoelectric crystal.

29. The system of claim 28 wherein the transducer is affixed to the mold.

30. The system of claim 26 wherein the generator further includes means for generating a sweeping frequency continuous wave acoustic signal.

31. The system of claim 30 wherein the generator further includes means for generating a sweeping frequency continuous wave acoustic signal in an ultrasonic frequency range.

32. The system of claim 26, wherein the system is configured to sense and indicate at least one of: a) mold filled; b) packing completed; c) solidification of a substance in the mold cavity; and d) temperature of a substance in the mold cavity.

33. The system of claim 26, further comprising a piezoelectric electro-acoustical transducer is affixed to the mold in a position where it is at a selected distance from the cavity defined by the mold.

* * * * *